United States Patent [19]

Duchesneau et al.

[11] Patent Number: 4,588,354
[45] Date of Patent: May 13, 1986

[54] ENGINE SPEED CONTROL IN PROPELLER PITCH CONTROL SYSTEMS

[75] Inventors: Jerome G. Duchesneau, Andover; Robert A. Schwartz, Vernon, both of Conn.

[73] Assignee: United Technologies Corporation, Hartford, Conn.

[21] Appl. No.: 520,659

[22] Filed: Aug. 5, 1983

[51] Int. Cl.⁴ .............................................. B64C 11/40
[52] U.S. Cl. ........................................ 416/27; 416/47; 416/48
[58] Field of Search ................. 416/25, 27, 44, 47, 416/48, 30, 36, 157 R(U.S. only)

[56] References Cited

U.S. PATENT DOCUMENTS

| | | |
|---|---|---|
| 2,337,613 | 12/1943 | Martin . |
| 2,378,938 | 6/1945 | McCoy . |
| 2,388,276 | 11/1945 | McCoy . |
| 2,426,007 | 8/1947 | Forsyth . |
| 2,636,566 | 4/1953 | Jedrziewski . |
| 2,640,555 | 6/1953 | Cushman . |
| 2,720,927 | 10/1955 | Mergen et al. ........................ 416/36 |
| 2,738,022 | 3/1956 | Zwack . |
| 2,840,170 | 6/1958 | Best ...................................... 416/47 |
| 2,865,460 | 12/1958 | St. John ............................... 416/47 |
| 2,910,126 | 10/1959 | Jedrziewski . |
| 2,913,056 | 11/1959 | Farkas . |
| 2,923,361 | 2/1960 | Best . |
| 3,001,588 | 9/1961 | Fischer . |
| 3,024,848 | 3/1962 | Chilman et al. . |
| 3,068,943 | 12/1962 | Fischer . |
| 3,115,938 | 12/1963 | Fischer et al. ........................ 416/48 |
| 3,170,521 | 2/1965 | Gaubis et al. . |
| 3,212,586 | 10/1965 | Barnes et al. . |
| 3,261,406 | 7/1966 | Goodman et al. .............. 416/157 X |
| 3,302,724 | 2/1967 | Brooks et al. ......................... 416/27 |
| 3,389,641 | 6/1968 | Barnes ........................ 416/157 R X |
| 3,527,186 | 9/1970 | Wennberg et al. ......... 416/157 R X |
| 3,589,830 | 6/1971 | Mogren ................................... 416/1 |
| 3,802,799 | 4/1974 | McMurtry ........................ 416/157 |

FOREIGN PATENT DOCUMENTS 7900306  3/1980  Netherlands .......................... 416/43

Primary Examiner—Everette A. Powell, Jr.
Attorney, Agent, or Firm—John Swiatocha

[57] ABSTRACT

In a propeller pitch control system, a selector 10 isolates engine (42) speed control in one of two engine governor (175 and 300) systems. The selector is input with fluid pressure signals from a pair of pilot valves (215 and 325), each operated by a corresponding one of the governors. The selector passes the signal of lowest magnitude to an actuator 40 which sets blade pitch in accordance with the magnitude of the signal whereby the governor providing such signal (through its associated pilot valve) controls engine speed independently of the other governor.

6 Claims, 1 Drawing Figure

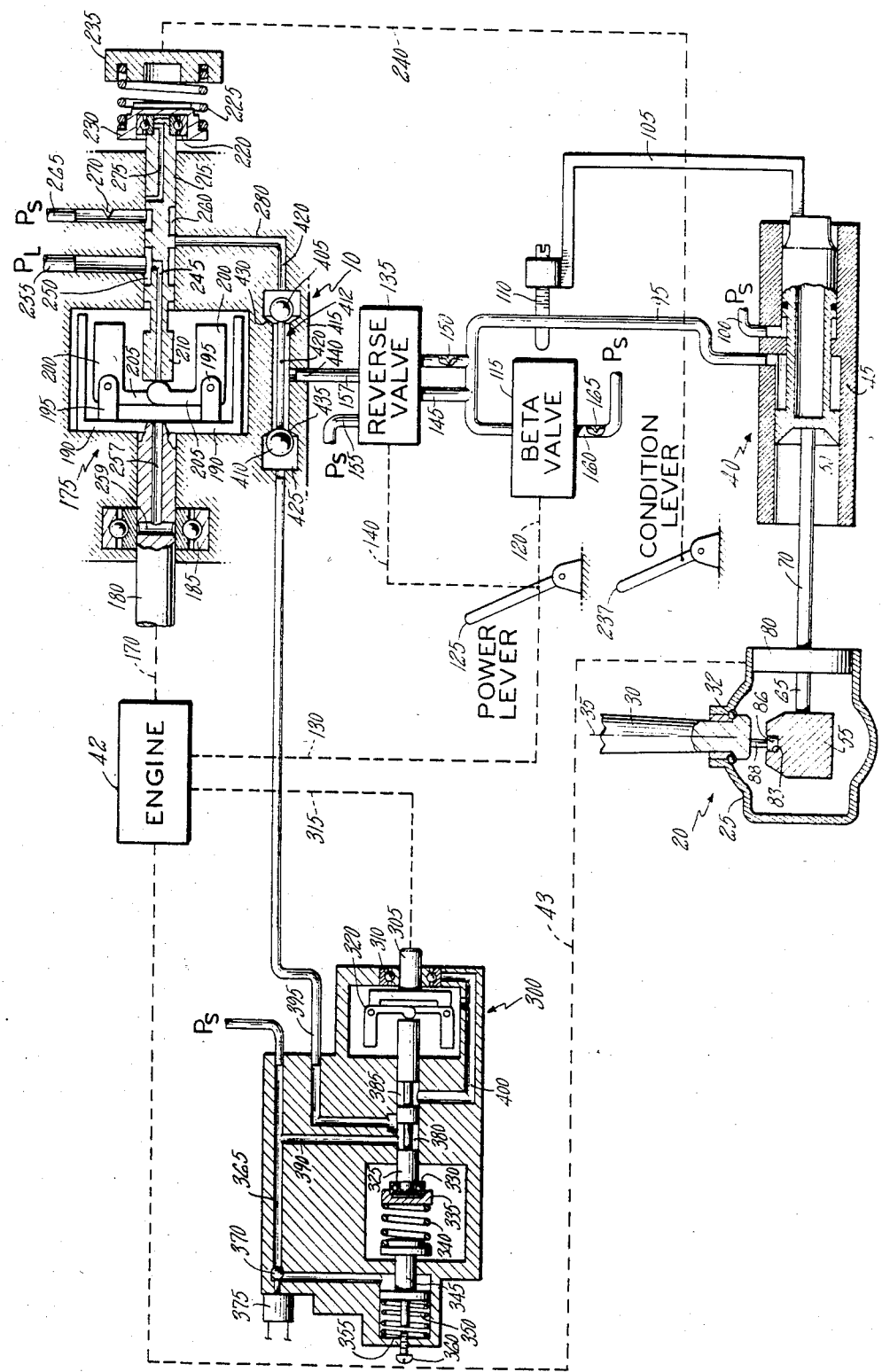

ENGINE SPEED CONTROL IN PROPELLER PITCH CONTROL SYSTEMS

DESCRIPTION

1. Technical Field

This invention relates generally to pitch control systems for variable pitch propellers and more particularly to the control of engine speed by means of adjustments in propeller blade pitch.

2. Background Art

It has long been known to control the operation of propeller driven aircraft such as, for example, to control the speed of the aircraft's engine by adjusting the pitch of the individual propeller blades. Typically, to control engine speed while the aircraft is in flight, the pilot sets a condition lever which adjusts the setting of an engine speed governor driven by the engine. The governor, by way of certain collateral apparatus, energizes a pitch actuator connected at an output member thereof to the propeller, thereby adjusting blade pitch, such adjustment altering air resistance to the rotation of the propeller blades to thereby control engine speed.

In most modern aircraft, the actuator is of the hydraulic variety, movement of the output member thereof being responsive to adjustments in the pressure of the hydraulic fluid which drives the actuator. Such adjustments in pressure are usually effected by adjustments in the setting of an hydraulic fluid controlling pilot valve by the aforementioned engine speed governor. Engine speeds which vary from that corresponding to a desired governor setting cause the governor to adjust the pilot valve setting and therefore the pressure of the hydraulic fluid energizing the pitch change actuator. Such a pressure change causes movement of the actuator output member to adjust blade pitch to a setting corresponding to the desired engine speed.

As those skilled in the art will appreciate, a malfunction of the engine speed governor, the associated pilot valve, or any of the hydraulic system connected between the pilot valve and the pitch change actuator could result in engine overspeed conditions due to errors in hydraulic fluid pressure experienced by the actuator and hence, in blade pitch setting. To minimize the risk of such engine overspeed conditions as well as the attendant risk of damage to the engine and propeller, the aircraft may be provided with a backup (overspeed) governor and associated pilot valve to take over control of blade pitch from the main governor and pilot valve in the event of such a malfunction. Such an overspeed governor and associated pilot valve function in substantially the same manner as the main governor and pilot valve described hereinabove, that is, by adjusting the pressure of hydraulic fluid input to the pitch change actuator in response to engine speed conditions. With dual engine speed governors and pilot valves, it will be appreciated that an arrangement for isolating control of the pitch change actuator in either the main governor and servo valve or the overspeed governor and servo valve, is required. Furthermore, it will be appreciated that such an arrangement should be as compact as possible, capable of being manufactured at a minimum cost, and effective enough to prevent a hydraulic malfunction in either of the speed governor-pilot valve systems from influencing the other, thus minimizing the risk of error in pitch settings.

DISCLOSURE OF INVENTION

It is therefore a principal object of the present invention to provide an improved arrangement for isolating control of propeller pitch in one of two engine speed governor systems.

It is another object of the present invention to provide such an improved arrangement which is characterized by an economy of both cost and structure as well as an enhanced compactness.

It is another object of the present invention to provide such an improved arrangement characterized by an effectiveness which minimizes the risk of a malfunction in one engine speed governor system from adversely effecting the operation of a backup system therefor.

In accordance with the present invention, a pitch control system which is provided with a pair of engine speed governors controlling a pair of means for applying control signals indicative of desired blade pitch to a pitch change actuator, is also provided with control means operably connected to the signal application means and responsive to the control signals therefrom, such control means passing a single one of the control signals in response to the relative magnitudes thereof. In the preferred embodiment, the pitch control system is of the hydromechanical variety wherein the pitch change actuator comprises an hydraulic actuator and the apparatus for applying the control signals to the actuator comprise pilot valves set by the engine speed governors. In such a system, the control signals comprise pressures of the hydraulic fluid metered to the actuator by the pilot valves. The control means comprises a selector for applying one of the fluid pressure control signals to the actuator. The selector may comprise a valve having first and second moveable valve elements responsive to the control signals, the control signal of greatest magnitude seating the corresponding valve element which maintains the other valve element unseated for passing the control signal of lesser magnitude to the actuator.

BRIEF DESCRIPTION OF DRAWING

The sole FIGURE is a schematic representation of a pitch control system for a variable pitch propeller employing the present invention.

BEST MODE FOR CARRYING OUT THE INVENTION AND INDUSTRICAL APPLICABILITY THEREOF

Referring to the drawing, the present invention shown generally at 10 is incorporated in a pitch control system for a variable pitch propeller 20 which includes a hub 25 supporting any desired number of blades (one being shown at 30), which are adjusted in pitch by pivotal movement on bearings 32 about longitudinal axis 35 thereof in response to operation of pitch change actuator 40. The propeller is driven by engine 42 connected to the propeller by any suitable power transmission means indicated by dashed line 43. Actuator 40 includes a cylinder 45 having a piston 50 reciprocable therewithin. Piston 50 connects to cam 55 by connecting rods 65 and 70 and bearing pack (rotary to nonrotary interface) 80. Cam 55 includes a slot 83 therein within which roller 86 is received, the roller being mounted to trunnion 88 extending radially inwardly from the root of blade 30. Those skilled in the art will recognize that reciprocation of actuator piston 50 effects a similar reciprocation of cam 55, engagement of roller 86 with slot 83 causing a rotation of the blade on bearing 32, about axis 35, to adjust blade pitch.

The description of the variable pitch propeller system given hereinabove is merely exemplary of a common type of variable pitch propeller system with which the invention hereof may be employed and is not part of the invention herein.

It will be understood by those skilled in the art that the magnitude of propeller blade pitch change effected by actuator 40 is determined by the admission of hydraulic fluid thereto and the draining of fluid therefrom. As shown in the drawing, metered fluid is admitted to the actuator through conduit 95, such fluid pressurizing and urging the piston to the left in a direction of decreasing blade pitch. Fluid at a constant supply pressure $P_S$ is provided to the actuator through conduit 100, such fluid pressurizing and urging the piston to the right in a direction effecting an increase in blade pitch. As indicated in the drawing, the piston area pressurized by fluid from conduit 95 is substantially larger (on the order of twice) than the area of the piston pressurized by fluid in conduit 100. Accordingly, those skilled in the art will recognize piston 50 as a "half area piston" wherein the application through fluid conduit 95 to the piston 50 of one-half the pressure $P_S$ will balance the piston against movement thereof. It will be seen that adjustment of the pressure in first fluid conduit 95 upwardly or downwardly from $P_S/2$ adjusts the force on the left-hand portion of the piston upwardly or downwardly to achieve a desired piston displacement.

Piston 50 includes a bracket (arm) 105 extending outwardly and upwardly therefrom, bracket 105 including an adjustable abutment 110 threaded into the end thereof. Abutment 110 is engageable with a movable portion (not shown) of a beta valve 115 supplied with hydraulic fluid at supply pressure $P_S$ through conduit 160 having orifice 165 therein which reduces the pressure of the fluid. The beta valve is mechanically connected by any suitable means such as a linkage 120 to engine power lever 125 which is in turn connected by means of any suitable connection 130 to engine 42 for controlling the power output thereof. Power lever 125 is also connected to a reverse valve 135 by a linkage or other suitable connecting means indicated at 140. The reverse valve communicates with beta valve 115 by means of conduits 95, 145 and 147 which includes flow restrictor (orifice) 150 therein. The reverse valve is supplied with hydraulic fluid at supply pressure $P_S$ through line 155 and, in a manner to be described hereinafter in more detail, with metered hydraulic fluid through conduit 157.

That part of the propeller pitch control system comprising the reverse valve, the beta valve, the hydraulic connections thereto and the mechanical connections between those valves and power lever 125 form no part of the present invention but rather, are included herein as background information on a typical environment in which the present invention may be employed. Suffice it to say that under normal operating conditions (governor control of engine speed) metered hydraulic fluid supplied to the reverse valve 135 from conduit 157, is valved to beta valve 115 and actuator 40, the pressure of the metered fluid being determinative of the direction of blade pitch adjustment effected by the actuator. At certain blade pitch angles, direct power lever (beta) control of blade pitch is required. Under such conditions hydraulic fluid from conduit 155 at supply pressure $P_S$ is valved to the beta valve by the reverse valve. This relatively high pressure fluid is also valved to actuator 40 by the reverse valve through conduit 95, moving the actuator piston to the left, in a decreasing pitch direction. Such movement brings abutment 110 on arm 105 into engagement with the member within the beta valve which is connected by linkage 120 to the power lever for movement therewith, whereby such power lever movement effects a corresponding movement of arm 105 and actuator piston 50 for direct power lever control of blade pitch.

Engine 42 is connected, by way of shaft 170 to a main engine speed governor 175 of any known construction. As shown in the drawing, the main governor comprises a shaft 180 connected to shaft 170 and mounted for rotation therewith on bearings 185. Shaft 180 includes at the end thereof a pair of brackets 190 provided with arms or mounts 195 on which a pair of flyweights 200 are pivotally mounted. Each of flyweights 200 includes a radially inwardly extending integral leg 205 abutting a foot portion 210 of a pilot valve spool element 215 mounted for rotation with governor 175 on bearings 220 disposed within retainer 230. The valve spool is urged longitudinally into abutment with the flyweights by a compression spring 225 received between bearing retainer 230 and a spring retainer 235. As illustrated, spring retainer 235 is mechanically connected, by any suitable connection (such as a linkage) indicated by dashed line 240, to a condition lever 237 by which the pilot of the aircraft sets a desired engine speed. Spool element 215 is provided with an interiorly disposed longitudinal passage 245 which terminates at an annular recess 250. Recess 250 communicates with a passage 255 in the valve housing by which the pilot valve is supplied with low pressure hydraulic fluid at pressure $P_L$ for lubrication of the abutment of foot 210 with flyweights 200 as well as lubrication of the governor bearings 185, lubricant being channeled thereto through longitudinal passage 257 and radial passages 259 connected thereto, both passages 257 and 259 being disposed interiorly of shaft 180.

Spool valve element 215 also includes an annular recess 260 which communicates with conduit 265 in the valve housing. Conduit 265, input with hydraulic fluid at supply pressure $P_S$, includes an orifice 270 therein for reducing the pressure of the hydraulic fluid ducted to the valve spool. Bearings 220 are lubricated by any fluid leakage from recess 260 over the surface of the spool and into internal longitudinal passage 275 which communicates at the right-hand end thereof with the bearings 220.

As those skilled in the art will readily appreciate, in operation, governor 175 rotates with the engine due to its connection therewith. Changes in centrifugal force associated with changing the speed of rotation of flyweights 200 causes the flyweights to pivot, such pivoting displacing the ends of legs 205 thereby, in the case of increased speed, moving the pilot valve spool, or, in the case of decreased speed, allowing the spool to be moved by spring 225. Such movement of the pilot valve spool meters hydraulic fluid from passage 265 to outlet conduit 280. An adjustment in the position of the condition lever to vary engine speed, adjusts the position of spring retainer 235 by virtue of the interconnection between these components. Such a repositioning of the spring retainer effects an alteration in the compression of spring 225, thereby longitudinally imbalancing the valve spool. Such imbalancing repositions the valve spool, thereby altering the pressure of hydraulic fluid metered by the spool to actuator 40 for varying the pitch setting of the blades and thus, engine speed.

As set forth hereinabove, it is a common practice to provide propeller driven aircraft with a backup (overspeed) governor for the purpose of assuming blade pitch control in the event of a failure of the main governor or pilot valve. Such a backup governor is shown generally at 300, including a rotor 305 mounted on bearings 310. Rotor 305 is driven by engine 42, being connected thereto by any suitable connection indicated by dashed line 315 and is provided with centrifugally responsive flyweights 320 pivotally mounted thereon in the manner described hereinabove with respect to the main governor. Flyweights 320 abut a movable spool element 325 of a backup pilot valve and position that spool in response to pivotal movement of the flyweights due to the rotation thereof. Spool 325 is mounted for rotation with governor rotor 305 on bearings 330. Bearings 330 are fixed within a bearing retainer 335, a coil compression spring 340 being received between bearing retainer 335 and spring retainer 345. A second coil spring 350 compressed between spring retainer 345 and fixture 355 urges spring retainer 345 and hence bearing retainer 335 and spool valve element 325 rightwardly, into engagement with the backup governor rotor. Fixture 355 is provided with an adjustment screw 360 by which the position of spring retainer 345 (and hence of pilot valve element 325) corresponding to an abutment of the spring retainer with fixture 355 is adjusted. This adjusts the preload of spring 340 and thus the force required by pilot valve element 325 to compress spring 340 for setting the speed at which rotor 305 of backup governor 300 moves the pilot valve element. Spring retainer 345 is held against screw 360 by hydraulic fluid at supply pressure $P_S$ applied to an inner face of spring retainer 345 through conduit 365. The admission of fluid to the spring retainer is controlled by a ball valve 370 operated by solenoid 375.

Spool valve element 325 is provided with annular recesses 380 and 385, recess 380 communicating with passages 390 and 395 in the valve housing. Hydraulic fluid at supply pressure $P_S$ is applied to recess 380 by way of passage 390, the metering of such fluid to outlet conduit 395 being controlled by the position of valve spool 325 as set by backup governor 300. Normal fluid leakage along the surface of the valve spool is channeled to bearings 310 for the lubrication thereof through annular recess 385 and conduit 400 in the valve housing.

Both conduits 280 and 395 through which metered hydraulic fluid is delivered from pilot valves 215 and 325, respectively connect to selector 10 which comprises a pair of ball valve elements 405 and 410 received within a passage 412 in housing 415. The ball valve elements are interconnected by a rod 420. Passage 412 interconnects first and second inlets 420 and 425, defines seats 430 and 435 on which ball valve elements 405 and 410, respectively, are seated and communicates with an outlet 440 communicating with conduit 157 through which metered fluid is admitted to reverse valve 135.

As set forth hereinabove, in the event of failure of the main governor and pilot valve subsystem, it is required that the backup governor and pilot valve assume control of engine speed. For example, in the event that a malfunction occurs which applies higher than required metered pressure to pitch change actuator 40 through line 95, a negative error in propeller blade pitch results. Such an error would cause engine speed to increase from the desired speed, thereby risking damage to the engine and propeller systems. By the present invention, such risks are minimized by selector 10 which responds to the hydraulic control (pressure) signals in lines 280 and 395 by a seating of the ball valve corresponding to the highest of the two pressures. Inasmuch as the ball valve elements are connected by rod 420, a seating of one of the valve elements is accompanied by an unseating of the other valve element, thereby opening the passage through the selector valve between the inlet through with the lower pressure fluid is admitted and outlet 440 (and hence, ultimately, pitch change actuator 40) whereby the fluid pressure input to the reverse valve (and hence, the actuator) is determined by the setting of the governor and pilot valve system which provides the lowest output pressure. Thus, for example, if the main governor-pilot valve subsystem fails and provides too high a pressure to selector 10, such a pressure will seat ball valve 405 thereby cutting off the high pressure flow to the reverse valve and at the same time, unseat ball valve 410, thereby allowing the lower pressure output from the backup governor and pilot valve to be applied to the actuator for a correct setting of propeller blade pitch.

Those skilled in the art will also appreciate that should one of the governor-pilot valve subsystems malfunction by excessive leakage therefrom, selector 10 will effectively isolate the malfunctioning governor-pilot valve from the other system so that fluid pressures associated with operation of the other system will not be influenced by such a malfunction. By way of example, it will be noted that leakage from pilot valve 215 would lower the pressure from that required to maintain the desired engine speed and accordingly, an adjustment in the condition lever may be required to maintain desired engine speed. However, the output pressure from the backup pilot valve to selector 10 within line 395 maintains ball valve 410 seated whereby any such leakage from valve 215 does not influence the backup governor-pilot valve subsystem.

Furthermore, it will be seen that selector 10 is economical in structure and therefore in cost, the selector comprising a relatively uncomplicated housing, a pair of interconnected ball valves, and a relatively simple passage arrangement therewithin. Accordingly, with the present invention, the hereinabove noted characteristics are achieved in an economical and uncomplicated manner.

While in the preferred embodiment, a dual ball selector valve has been shown, it will be appreciated that various other valving arrangements which isolate the fluid pressure signals from the main and backup governor-pilot valve subsystems may be employed. Likewise, while a fluid mechanical system has been shown, it will be appreciated that various other governors such as electrical governors may be employed in which case selector 10 will function to distinguish between electrical output signals, passing only the signals of predetermined relative magnitude. It will also be understood that various other modifications of the present invention apparent from the disclosure herein will suggest themselves to those skilled in the art and it is the intention of the following claims to encompass such modifications as fall within the true scope of this invention.

Having thus described the invention, what is claimed is:

1. A pitch control system for a variable pitch propeller powered by an engine, said pitch control system including an actuator connected to the blades of said propeller for movement thereof in pitch change directions; said pitch control system being characterized by:
   an engine speed governor;
   first signal means for establishing a first variable control signal indicative of a desired pitch setting;
   means operatively connecting said engine speed governor to said first signal means for setting said first signal means in response to the output of said engine speed governor under normal engine operating speeds;
   a backup governor;
   second signal means for establishing a second variable control signal indicative of a desired pitch setting;
   means operatively connecting said backup governor to said second signal means for setting said second signal means in response to said backup governor under engine overspeed conditions;
   connection means connecting said first and second signal means to said actuator for application of said first and second control signals thereto from said first and second signal means; and
   said connection means including control means responsive to said first and second control signals, for isolating said first and second control signals from one another and passing a single one of said control signals to said actuator in response to the relative magnitude of said control signals.

2. The pitch control system of claim 1 characterized by:
   said actuator comprising an hydraulic actuator;
   said first and second signal means comprising first and second pilot valves operated by said engine speed governor and said backup governor respectively;
   said control signals comprising fluid pressure signals;
   said connection means comprising hydraulic conduit; and
   said control means comprising a selector valve including first and second inlets communicating with said first and second pilot valves, respectively, by way of said hydraulic conduit and an outlet communicating by way of said hydraulic conduit with said actuator.

3. The pitch control system of claim 2 characterized by said selector valve comprising a housing provided with a passage therewithin; said passage interconnecting said first and second inlets with said outlet; and
   first and second valve elements seatable within said passage adjacent said first and second inlets, respectively, the greater of said fluid pressure signals from one of said pilot valves, when applied to said selector valve, causing the seating of a corresponding one of said selector valve elements, and the unseating of the other of said valve elements, thereby opening said passage between said outlet and the other of said pilot valves, whereby the fluid pressure control signal input to said actuator is determined by the setting of the other of said pilot valves by the corresponding engine governor.

4. The pitch control system of claim 3 characterized by said first and second selector valve elements being operatively intergageable such that a seating of one of said selector valve elements initiates and maintans the unseating of the other of said selector valve elements.

5. The pitch control system of claim 1 characterized by said engine speed governor and said backup governor comprising centrifugal governors including rotors carrying flyweights responsive to the rotational speed of said rotors, said rotors being supported by bearings and characterized by internal fluid passages communicating with a source of lubricant and said bearings and accommodating flow of lubricant from said source thereof to said bearings.

6. The pitch control system of claim 5 characterized by said signal means comprising hydromechanical pilot valves including spool portions supported by bearings for rotation with said governor rotors, said valve spools being characterized by internal fluid passages communicating with a source of lubricant and said spool bearings for accommodating a flow of lubricant from said source thereof to said spool bearings.

* * * * *